June 6, 1939. W. F. ZIMMERMANN 2,161,269
MACHINE FOR SLOTTING CUTTER BODIES
Filed Jan. 19, 1938 5 Sheets-Sheet 3
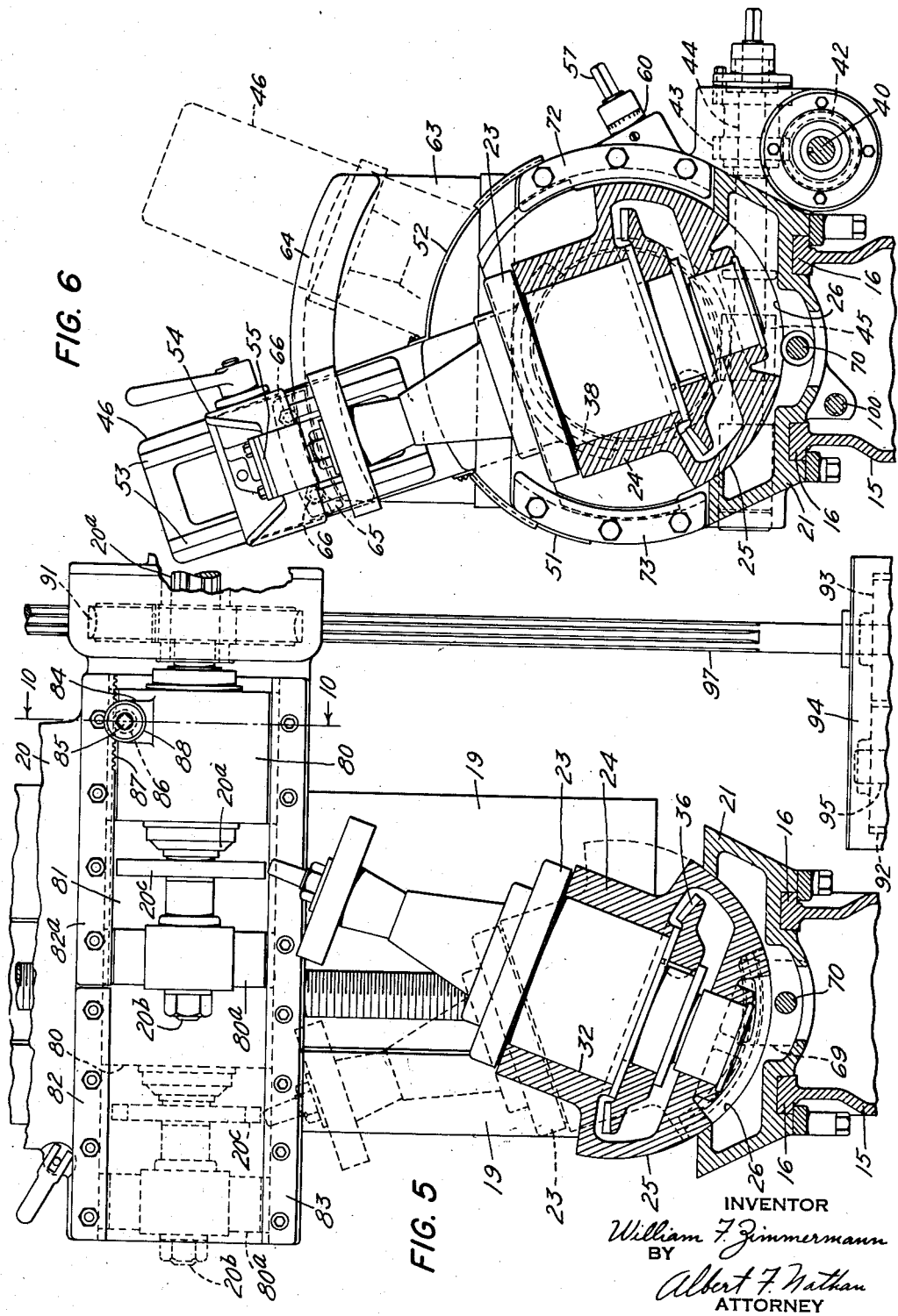
INVENTOR
William F. Zimmermann
BY
Albert F. Nathan
ATTORNEY June 6, 1939. W. F. ZIMMERMANN 2,161,269
MACHINE FOR SLOTTING CUTTER BODIES
Filed Jan. 19, 1938 5 Sheets-Sheet 4

INVENTOR
William F. Zimmermann
BY
Albert F. Nathan
ATTORNEY

June 6, 1939.   W. F. ZIMMERMANN   2,161,269
MACHINE FOR SLOTTING CUTTER BODIES
Filed Jan. 19, 1938   5 Sheets-Sheet 5

INVENTOR
William F. Zimmermann
BY
Albert F. Nathan
ATTORNEY

Patented June 6, 1939

2,161,269

UNITED STATES PATENT OFFICE 2,161,269

MACHINE FOR SLOTTING CUTTER BODIES

William F. Zimmermann, Maplewood, N. J., assignor to Gould & Eberhardt, Newark, N. J., a corporation of New Jersey Application January 19, 1938, Serial No. 185,737

15 Claims. (Cl. 90—15.1)

This invention relates to a machine for cutting radial slots in peripheral portions of insertable blade cutter bodies and more particularly to an improved method and mechanism for cutting the slots at an angle to the axis of the cutter body and simultaneously at an angle to a radial plane of the cutter body.

The term cutter body, as herein used, refers to the bodies of insertable blade milling cutters, boring heads, reamers, and the like, and heretofore great difficulty has been experienced in spacing and in forming the blade receiving slots of uniform shape and dimensions and at the proper rake and axial angles determined upon for a particular cutter.

Proper spacing of the blade slots around the periphery of the body is necessary to avoid an unbalanced cutter or one that would produce irregularities in the finish or cuts made by the blades. Uniformity in shape and size of the respective slots is also an essential requirement, necessary to afford interchangeability and blade replacement and to secure uniformity in position of the blades when the blades are inserted in the slots. Subsequent truing and sharpening of the cutter to size will not, if it is properly constructed, result in excessive removal of expensive blade material from any one blade.

The efficiency of an assembled cutter also depends on the rake and clearance angles of the cutting edges, and in cutters of this type in which the rake angle is not subsequently ground on the blade but exists by virtue of the position of the blade in the body, the slot which receives the blade must, therefore, be formed at the correct angle relative to the radial plane of the cutter. Also, with cutters designed to cut at their outer peripheral edges, the outer longitudinal cutting edge of the blade in some cases, may parallel the rotary axis whereas in other cases, for example, a skew cutter or an alternate angle cutter, the outer cutting edge is at an angle to the rotary axis. In the latter instance, the plane of each of the blade slots must be accurately formed at a compound angle relative to a radial plane of the cutter body.

The problems and difficulties involved in forming blade slots of the above character in cutter bodies is further complicated and rendered more difficult when the blade clamping means comprises merely a tapering of the blade itself, or when a plain or tapered blade is used in conjunction with a single or compoundly tapered lock piece, where a single or two-part tapered blade and wedge members are employed, which is the case of most cutters now used, the walls of the blade slots must likewise be inclined relative to each other complemental to the tapers of the insertable blade or blade units. Where the taper extends in one direction only, say radial, an additional problem is presented, and where the taper extends in two directions, i. e., radially and axially, a more complex problem is presented which is additional to those above mentioned respecting rake and clearance angles on straight and skew milling cutters.

A primary aim of the present invention is to eliminate the difficulties heretofore experienced in forming slotted cutter bodies, and to eliminate from the manufacture thereof, all of the complexities of the problems attending the cutting of single or compoundly tapered slots of which one wall at least is also singly or compoundly inclined relative to the other and/or to a radial plane of the cutter body.

A further objective of the invention is to construct a slotting machine capable of substantially universal adjustment and numerous settings for cutting a large variety of shapes and sizes of slots in cutter bodies, and which after a given adjustment or setting is made, is capable of automatic indexing movements uniformly to locate and cut a predetermined number of the slots in the periphery of a cutter body of any given size.

Still a further object of the invention is to eliminate vibration incident to the slotting operation and its deleterious effects upon the walls of the slots and to make provision for a large and massive under-support for the cutter body cooperatively arranged with an equally large and massive over-support for the free end of the arbor which carries the cutter blank to be slotted.

The invention further aims to render available a structure in which the carriage that supports the tiltable work blank, is manually adjustable unitarily toward or away from the path of reciprocation of the tooling cutter for regulating the depth of the slot to be cut in respect to the diameter of the work blank, and in which the work blank may be cyclically indexed from station to station in any of its tilted or bodily shifted positions.

The invention further aims towards a construction that will eliminate all need for extraneous jigs and fixtures, and an arrangement by which the over and under arbor supports are adjustable angularly as a unit in inclining the axis of the work blank relative to the path of reciprocation of the cutting tool, and thereafter capable of firm and rigid clamping to a common translatable carriage.

A further object of the invention is to render available a machine in which the relation of the plane of the tooling cutter to a radial plane of the work blank may be varied to suit the radial angle of the slot to be cut, and also capable of variation to suit the radially extending taper angle of the slot in those cases where a radial tapering of the finished slot is required. Preferably this adjustment of the relation between cutting tool and the work blank is accomplished by shifting the cutting tool itself laterally to one side of the radial plane of the workpiece and then adjusting the work supporting carriage toward or away from the cutting tool to form a slot a given depth or distance from the outer edge. This initial setting will allow the cutting tool to make a straight cut through the body blank and form a slot therein at a predetermined angle (rake angle) relative to a radial plane of a cutter body.

However, if the plane of the blade slot is also to be inclined laterally relative to the longitudinal axis of the body, the present invention contemplates tilting the axis of the work supporting arbor as much as 20° each side of the vertical, or 40° in all, which is ample for the steepest of skew blade cutters now used. Inasmuch as the cutter body to be slotted is of substantial thickness and, in accordance with the structural characteristics of this invention, is mounted above the axis of tilt, a correction or readjustment of the cutting tool must be made in a lateral direction to compensate for the lateral shifting of the work blank. The parts are then clamped firmly in position and the cutting operation is started. At the completion of the first slot, the cutting tool automatically retracts and the work blank automatically indexed to a new position. These operations are repeated until the required number of slots are formed around the workpiece.

If the blade slot is also to be tapered radially, say 5°, the angular position of the work blank is adjusted 5° from its former position, a compensating readjustment is made to the cutting tool (for width of slot), and a compensating readjustment also made to the work supporting carriage (for depth of slot). The adjustments just mentioned will result in forming the taper wholly upon one wall of the previously cut slot and leaving the opposite wall perfectly plain and untouched. If the slotting cutter itself is a formed cutter, i. e., one that will cut a tapered slot in one pass, the above mentioned compensating readjustments of the blank and cutting tool are dispensed with.

If the blade slot is also to be tapered in a transverse direction, i. e., longitudinally of the axis as well as radially, the inclination or tilt of the work arbor is again readjusted to the angle of longitudinal taper required, the work blank readjusted backwardly substantially to its original position and compensating adjustments made to both cutting tool and work supporting carriage properly to position the parts. The third and last pass of the cutting tool will now remove a tapered slice from the other wall of the previously formed slot.

The sequence of the foregoing explained operation is important in order to obtain flat bottoms and side walls in the respective slots and the success of the whole depends upon the success of each of the individual operations. These in turn, depend upon and require not only the skill of the operator in making the settings but upon the structure and ability of the machine itself to resist the reactionary forces and pressures of the tooling operation, and to hold the adjustment manually made. The present invention contemplates an arrangement and cooperative relation of parts having those ends in view.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and, in such drawings, like characters of reference denote corresponding parts throughout all the views, of which:

Fig. 5 is a sectional view along lines 5—5 of Fig. 4, looking in the direction of the cutter spindle and carriage.

Fig. 6 is a vertical section along lines 6—6 of Fig. 4 looking in the direction of the tilting work arbor and its supporting means.

Figure 4:
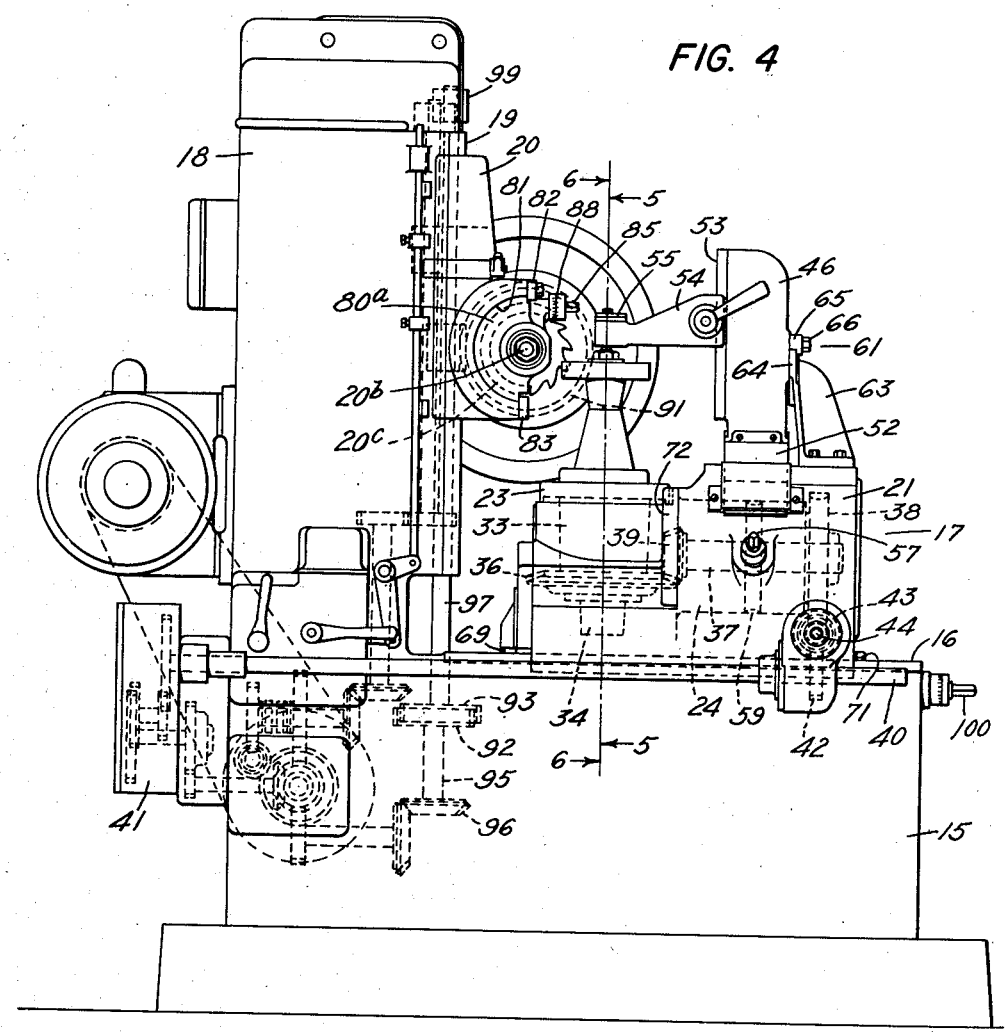
Fig. 4 is an elevational view of the machine for cutting slots, of the nature explained, in cutter bodies.

Referring more particularly to Fig. 4, the machine illustrated comprises a base member 15 having guideways 16 formed along the upper surface thereof upon which is translatably mounted a work carriage 17 that supports the work blank. One end of the bed also supports an upright stanchion 18 which has vertical guideways 19 formed at the front and translatably supporting a cutter spindle carriage 20.

Figure 7:
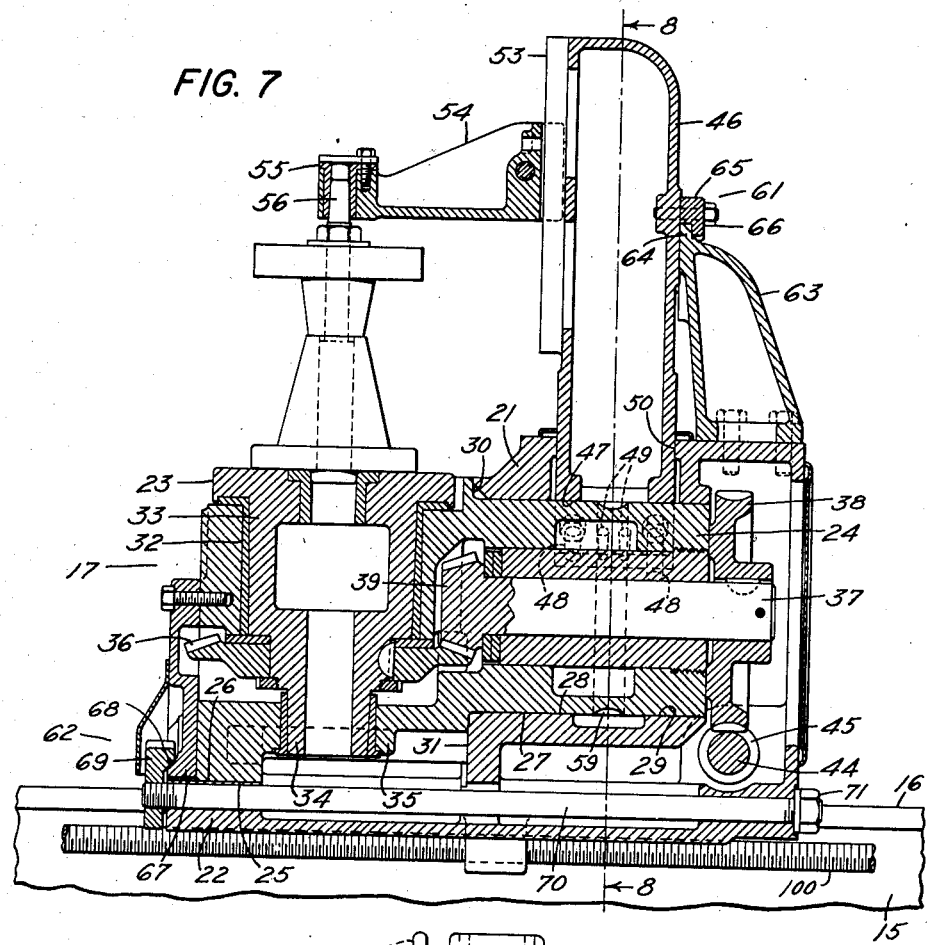
Fig. 7 is a longitudinal sectional view of the translatable work carriage illustrating more clearly the work table supporting elements and final portions of the indexible drive train.
Figure 8:
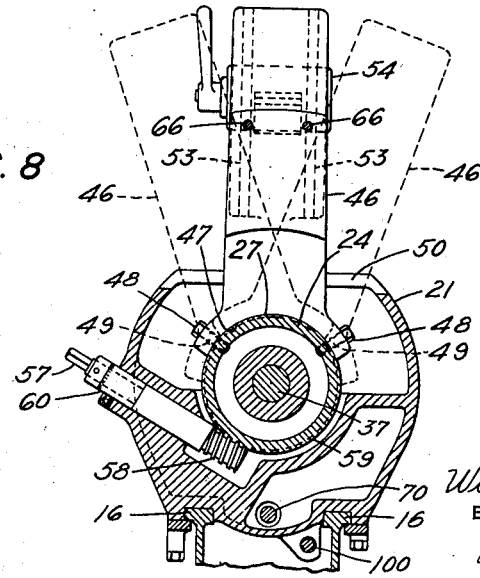
Fig. 8 is a detailed view substantially along line 8—8 of Fig. 7, and on a smaller scale, the mechanism for tilting the work support angularly.

Referring to Fig. 7, the translatable work carriage includes a main cylindrical frame member 21, the lower portions 22 of which extends forward and completely underlies the work table 23. Within the main frame 21 and extending substantially from end to end thereof, is a rotatable support 24 which has, at its forward end, a relatively wide arcuate bearing surface 25 adapted to cooperate with a complemental bearing surface 26 formed at the forward end of the main frame. The opposite end of the support 24 is provided with a long cylindrical bearing portion 27 which seats in complemental bearing portions 28 and 29 in the main frame 21. Between the bearing portions 25 and 27 of the support 24, a flange 30 is provided which is adapted to seat against a bearing surface 31 of the frame 21.

The complemental bearing surfaces just explained serve firmly to guide and support the work spindle support in all positions to which it may be tilted about its longitudinal axis.

The work spindle support 24 is substantially hollow and has formed in its forward portion a cylindrical bore 32 which extends at right angles to the longitudinal axis and provides the bearing means for a work spindle 33. The extreme lower end 34 of the spindle 33 is also supported in a bearing 35 provided in the support 24 and between the bearing portions 33 and 34 carries a bevel gear 36 by means of which the spindle and workpiece mounted thereon may be revolved. A drive shaft 37 journaled in the hollow support 24 concentric with its axis of rotation, transmits the power from a worm wheel 38, at its outer end, to a bevel gear 39 at its inner end, which gear meshes with the work spindle gear 36. An indexing shaft 40 extending from the gear box 41 of the machine has a splined connection with a spiral gear 42 journaled in a bracket carried at the side of the translatable carriage 17. The spiral gear 42 transmits motion to a similar gear 43 mounted upon a horizontal worm shaft 44, the inner end of which carries a worm 45 that meshes with the worm wheel 38. Through this drive train the work table is adapted to be indexed cyclically from station to station irrespective of the angle of tilt of the work arbor and its support. The splined connection between the index shaft 40 and the spiral gear 42 allows for carriage translation on guideways 16 without effecting the relation of the other elements of the index train.

In addition to providing large and firm bearing surfaces for supporting the work spindle at its under side, an important feature of the invention concerns the support for the upper or free end of the work arbor. A preferred means for achieving solidarity and rigidity in that upper end is disclosed in Figs. 4 and 7, and comprises, in part, an auxiliary stanchion member 46. The auxiliary stanchion 46 is provided at its lower end with an arcuate bearing surface 47 which is reamed to fit the peripheral surface of the portion 27 of the main rotatable support 24. The bearing portion 47 extends approximately ⅓ the angular distance around the cylindrical portion 27 and is rigidly secured thereto, by means of screws 48 and taper pins 49, with the center line of the stanchion parallel to the axis of rotation of the work spindle.

Inasmuch as the work table is tiltable approximately 40°, the stanchion 46, in this invention, tilts as a unit therewith. To permit such tilting motion of the stanchion, the carriage casing 21 is provided with a circumferential opening 50 which extends both ways from the center of the carriage a distance sufficient to allow the stanchion to swing therein. By means of arcuately shaped cover plates 51, 52 carried by the stanchion, the excess portions of the opening 50 are maintained covered and sealed against entry of chips and other foreign matters, in any angular position to which the stanchion and its related supporting member 24 may be adjusted.

The upper portion of the stanchion is provided with parallel guideways 53 upon which is slidably mounted a spindle supporting arm 54. The outer end of the arm 54 overlies the work spindle and is arranged to be fitted with bushings or suitable adapter means 55 for mounting the free end of a work supporting arbor 56.

The structure just explained forms a relatively massive U-shaped structure for supporting the work arbor at both sides of the blank to be slotted. In many instances, particularly boring heads and reamers, the blade slots are to be cut in blanks with attached or integral shanks, and for this additional reason, the supporting arm 54 is adjustable upon the stanchion 46 and may, of course, be moved toward or away from the work table as determined by the length of the cutter shank. After the work blank has been mounted in the supports, the whole may be swung bodily as a unit about the horizontal axis of the main support 24.

Self locking adjusting means are provided for swinging the U-shaped supporting unit angularly which comprises a manually operable shaft 57, worm gear 58, and worm wheel 59, cut preferably directly upon the cylindrical bearing portion 27 of the rotatable support 24. The outer end of the shaft 57 is provided with a graduated collar 60 calibrated in fractional parts so that the operator may quickly ascertain the angle of tilt given to the work blank. When the required adjustment has been made the tilting unit is clamped firmly in position.

The clamping means for this purpose includes three distinct clamps, namely, a stanchion clamp 61, a lower clamp 62 operative at the forward end of the rotatable element 24, and arcuate straps 72 and 73 which tend to prevent any vibration of the work head between said upper and lower clamps. The stanchion clamp 61 comprises an extension member 63 which is firmly secured to the upper surface of the carriage member 21 and has formed at its upper end an arcuate flange 64. The flange 64 is machine finished on both sides and cooperates with a clamp strap 65 carried by the tilting stanchion. Clamp nuts 66 serve to clamp the strap, flange 64, and stanchion 46 firmly together as a single element.

As will be observed by reference to Fig. 7 the stanchion clamp effects clamping action between the stanchion and the main carriage at a point quite distantly removed from the axis of tilt, and by this arrangement there is attained a very firm clamping of the parts with a minimum of effort. Actually, however, the stanchion clamp is located high enough on the stanchion so as to be, in the vast majority of slotting operations performed on this machine, beyond and outside the region of actual cutting operation.

The table clamp 62 is located at the extreme forward end of the tilting support 24 and comprises an arcuately shaped flanged member 67 inwardly beveled as at 68 around its periphery. A clamp shoe 69 having an overhanging portion, similarly beveled to fit the bevel 68, has a threaded connection with a clamp shaft 70 which extends lengthwise the carriage and is operable from the outer end thereof by a nut 71. When the nut 71 is moved in a clamping direction, the shoe 69 engages the flanged element 67 and by reason of the incline of the beveled surfaces 68, the outer or free end of the rotatable support 24 is firmly clamped between the arcuate bearing surfaces 25, 26 and between the engaging surfaces 30, 31. It is here to be noted that while the clamping action takes place between the surfaces 25, 26 and 30, 31 there is not any measurable movement between these parts incident to the clamping or unclamping action for, in the case of the annular bearing surfaces 30, 31, arcuate clamp straps 72 and 73 hold those surfaces slidingly in engagement and the action of the clamp means 62 and 72, 73 is to increase or decrease the pressure of that engagement. Likewise, with the clamping action between the arcuate surfaces 25, 26, these surfaces are ground within a .002 tolerance and continuously engage one another. And again the action of the clamp 62, as to the surfaces 25, 26, is to increase or decrease the pressure of that engagement without causing any measurable relative movement therebetween which otherwise would introduce an error in the machine.

For cutting straight slots in a radial plane in the work blank, the tilting work unit will be clamped in a vertical position and the slotting cutter set to cut on the radius as the tool head 20 is fed downwardly. However, in cases where the slots must be cut in a work blank at an angle to the radius (to provide a rake angle for the blades) the relation between the work blank and the slotting cutter must be altered.

Figure 9:
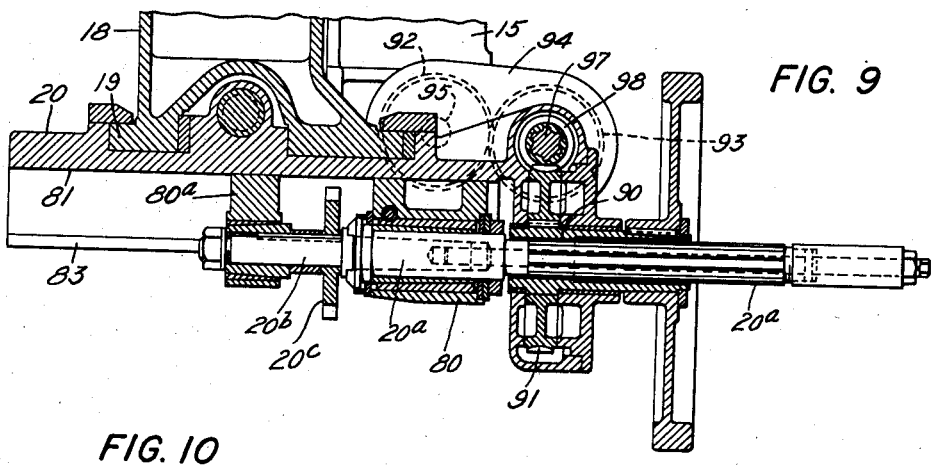
Fig. 9 is a sectional view through the cutter spindle carriage.
Figure 10:
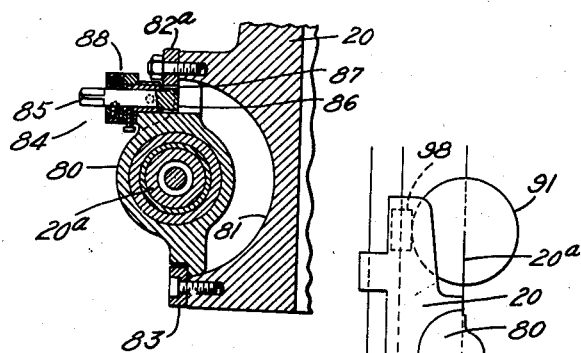
Fig. 10 is a sectional view along lines 10—10 of Fig. 5.

In Fig. 9 there is disclosed a preferred way of varying the radial relation between the work blank and cutter which consists in mounting the cutter in a manner whereby it may be shifted laterally. To that end the cutter spindle 20$^a$ is journaled in a bearing block 80 which, in turn, is fitted to a channel 81 extending crosswise the translatable head 20. Clamp and guide straps 82, 82$^a$, 83, which overlie portions of the bearing block, serve to clamp the latter and parts journaled therein in a predetermined position relative to the center line of the machine. For convenience in making the lateral adjustment, the bearing block is provided with a bracket portion 84 which journals an adjusting shaft 85. The inner end of the shaft 85 carries a pinion 86 which meshes with rack teeth 87 on the clamp plate 82$^a$. Thus, by applying the crank handle to the squared end of the shaft 85, the bearing block and cutter spindle carried thereby may be adjusted laterally to the required position. A pair of scales 88 graduated in inches, tenths, and thousandths, is provided for visually determining the amount of lateral shift.

The cutter spindle 20 is adapted to receive, in the usual manner, a cutter arbor 20$^b$ upon which is mounted a slotting cutter 20$^c$, and the outer end of the arbor is rotatably journaled in another shiftable bearing block 80$^a$. The driving end of the spindle 20$^a$ has a splined connection 90 with a worm wheel 91 journaled in bearings provided in the translatable head 20. As the cutter 20$^c$ is shifted to one side or the other of the center line of the machine, the power drive thereto is maintained through the splined connection 90, with a worm wheel 91.

In order to construct a machine adaptable to perform slotting operations in cutter bodies of a large variety, the lateral adjustment of the slotting cutter with respect to the center line of the machine must needs be substantial in each direction. To meet this requirement the bearing channel 81 in the tool slide is made relatively extensive in width. Likewise, the spindle 20$^a$ is made relatively long so as to be capable of performing its intended operation in either extreme adjustment within the range of the machine which, in the case of slotting a head on a long shank, may require as much as six inches of travel each way from center.

This condition introduces a problem in the power drive to the cutter which is inexpensively solved, with respect to an existing machine, by the provision of a pair of gears 92, 93 journaled in a supplemental bracket 94 located near the base of the machine. These gears are in addition to the usual and necessary cutter drive train. The gear 92 is mounted on a stub shaft 95 which receives power from the main driving transmission located in the base through a bevel gear 96. The gear 92 transmits the power to the gear 93 keyed to the lower end of a worm shaft 97, the upper portions of which has a splined connection with a worm gear 98 which drives the cutter spindle. The extreme upper end of the worm shaft 97 is journaled in bearings provided by an arm 99 projecting from the side of the main stanchion 18. By means just explained it has been made possible to shift the slotting cutter laterally major distances each way from center while at the same time maintain a power drive thereto in all of its various positions of adjustment.

As previously stated, lateral adjustment of the cutter must be extensive not only for the cutting of slots at the requisite rake angle but also to cut slots of a given rake angle in skew cutters, i. e., those cutters in which the blades are set somewhat spirally. In the latter instance, the work supporting table unit is tilted to the right or left, and as the work blank W lies in a plane a substantial distance above the axis of tilt, the tilting of the work blank likewise effects a lateral shifting of the blank as a whole with respect to the center line of the machine. Compensation for the lateral shift incident to tilting must be made and is initially provided for in the cutter spindle mounting disclosed herein.

Likewise, provision must be made for a further lateral adjustment in the cutter spindle to take care of the additional shift required in cutting radial tapers on the slots in the cutter blank, all of which has been provided for in the herein disclosed machine.

Figure 11:
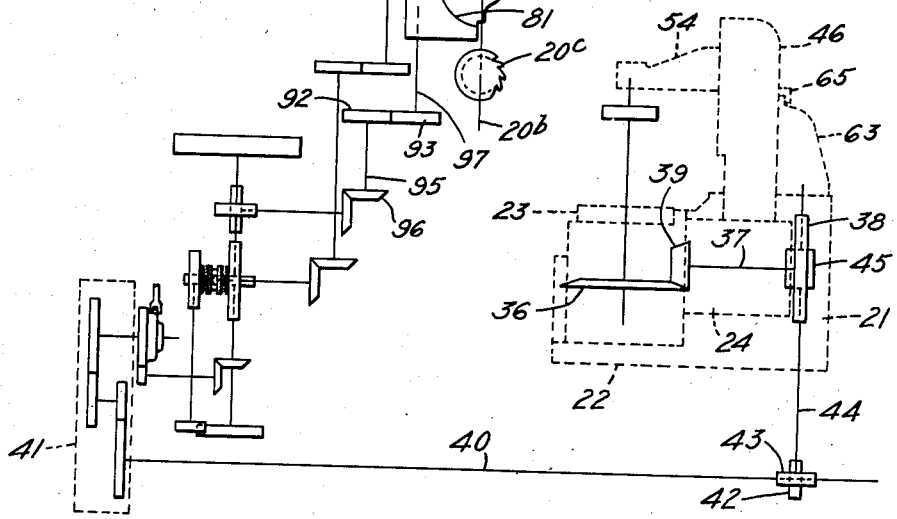
Fig. 11 is a line diagram of a power drive for the cutter spindle and work arbor.

The machine operates as follows: The operator mounts a cutter blank on the work table 23, lowers the supporting arm 54 thereover and clamps the parts firmly in position. If parallel walled radial slots are to be formed, the work supporting unit will be clamped in a vertical position and the tool cutter set on the radius of the blank. Manual means in the form of a hand operated screw 100 is provided for propelling the tilting carriage toward or away from the line of cut of the cutter spindle for regulating depth of slot. When these adjustments have been made and the parts clamped in position, the machine cycle is started. The tool head feeds downwardly at a feeding rate suitable for the actual tooling operation and at the completion of the slotting operation the head retracts rapidly and the work table 23 automatically is indexed to the next station and the cycle is repeated. The power feed to the cutter slide and the indexing mechanism herein referred to may follow conventional design. Fig. 11 illustrates diagrammatically a preferred form of drive mechanism.

The above explained operations result in the forming of a series of plain radial slots accurately spaced around the cutter body. Where, however, the slots are to be inclined relative to a radial plane (so as to form a rake angle on the blades), the cutting tool 20$^c$ will be offset in the tool slide a distance sufficient to form the slots at a tangent to the axis of the work blank. The lower portion of Fig. 1 of the drawings illustrates, in a general way, the set-up just explained.

Figure 2:
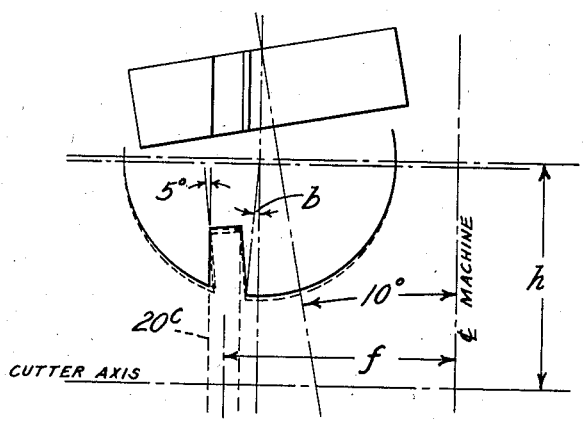
Figure 3:
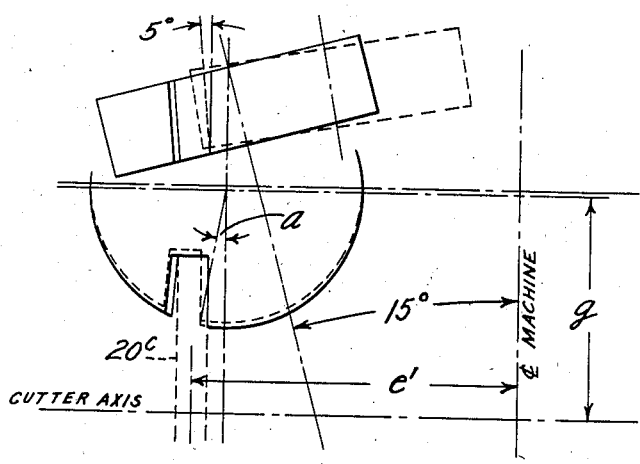

If the slots are also to have a taper in the radial direction, the first step will be that of cutting straight walled slots completely around the blank and then readjusting the work blank and cutter to the relation disclosed in the lower portions of Fig. 2 of the drawings. This adjustment includes further rotating of the cutter blank angularly the required number of degrees and readjusting the cutter laterally to position one side thereof on the line of the taper to be cut, and then retracting the work carriage so that the cutter will cut the same depth as before. The parts are then clamped in their readjusted positions and the previously explained machine cycle instituted once more.

Figure 1:
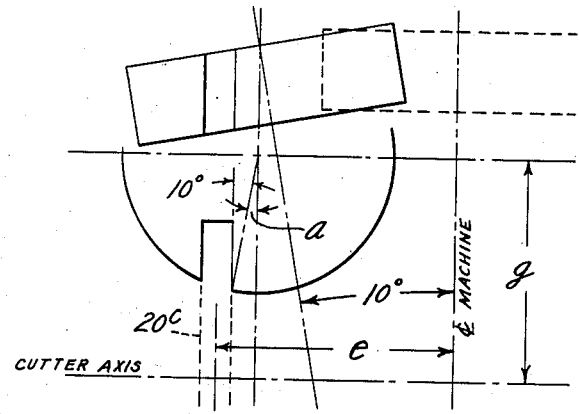
Figures 1, 2 and 3 illustrate diagrammatically the successive steps in the formation of a compoundly tapered slot in a circular body, which tapered slot is as a whole inclined in two directions relative to a radial plane of the said body.

The same steps are followed in cutting radially tapered slots in skew cutters, but in addition thereto, the work blank is tilted to the selected angle, as shown in the upper portions of Figs. 1 and 2. As the work blank is positioned above the axis of tilt, the tilting thereof shifts the blank bodily laterally. Accordingly, the later adjustments made to the cutter in the first and second steps of the operation, must be made with due regard to the extent of lateral shift of the work blank. In some cases a formed tooling cutter may be used which will require but one setting of the work blank and cutter instead of two.

Where the blade slots are to be formed with a longitudinal taper as well as a radial taper, a third setting is required. This third step includes tilting the work arbor a few degrees further from the positions of the steps one and two, rotating the cutter blank backwardly, to the position explained in connection with step number one, so that the longitudinal taper will be formed by removing a wedge shaped slice from the opposite wall of the slot, and then readjusting the cutter 20ᶜ laterally to the point wherein the opposite side of the cutter will cut along the line of the longitudinal taper. In other words, the radial taper (step two) is formed preferably by removing a slice from one wall of the slot and the longitudinal taper formed by removing a slice from the opposite wall of the slot. Using a plain disc type of cutter, i. e., one that cuts a square bottom slot, a square bottom in the work blank may be formed by this method even though one or both side walls of the slots are tapered.

Summarizing the steps involved in the cutting of flat bottomed double tapered slots tangent to the cutter axis and at an angle to the longitudinal axis, the following operations are carried through:

Step 1.—Tilt work blank and offset the cutter laterally the distance required for the tangential cut, clamp the parts, and machine the slots all the way around the blank.

Step 2.—Rotate the work blank through the distance required for the radial taper, make compensating lateral adjustment to cutter and withdraw work carriage to the point where the cutter will cut to the bottom of the previously made slot. Clamp the parts, and again machine the slots all the way around the blank.

Step 3.—Retilt the work blank to the angle required for the longitudinal taper, rotate the work disc back to position occupied in Step 1, adjust the cutter laterally to a position wherein it will cut along the line of the longitudinal taper, advance work carriage until cutter bottoms slot, clamp the parts, and machine the slots all the way around.

Substantially flat bottomed slots may be formed by merging Steps 2 and 3, that is, machine the radial as well as the longitudinal taper on one side wall simultaneously.

It will be understood that blade slots tangentially inclined opposite to that shown in Fig. 1, may be formed by working on the other side of the center line, and likewise, blade slots of opposite skew angle (opposite spiral) may be formed by tilting the work support to the other side of its center or vertical position and the cutter 20ᶜ shifted accordingly. Where an alternate angle cutter body is to be made, slots inclined at one angle will be made all the way around the blank, and then the intervening slots of the opposite angle will be made, thus requiring but two complete settings of slotting operations.

Dove-tail slots, i. e., those that are wider at their bottoms than at their periphery or surface, in the body blank, may be formed with equal ease by making one or more of the settings the converse of those previously explained in connection with Steps 2 and 3.

From the foregoing it will be observed, that with this invention the cutting of plain or tapered slots in cutter bodies has been rendered a comparatively simple and easy task. No auxiliary jigs, fixtures, or makeshift devices are required or necessary in the forming of smooth and plain surfaces upon the walls of the slots. When the last pass of the cutter is made in the last slot of the blank, the cutter body, if otherwise completed, is ready for the assembling of the blade teeth. And by reason of the accuracy with which the slots are formed, each blade will be driven to approximately the same position and acquire a firm solid seating in the cutter body.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine for cutting angularly disposed slots in insertable blade cutter bodies combining a tubular work carriage; a work supporting member rotatably journaled therein; a work blank supporting spindle journaled in said rotatable supporting member; said rotatable member having a laterally extending portion positioned in overlying relation with said spindle for supporting the free end of the body blank in all positions of rotation of the said supporting member; a cutter spindle slide; a slotting cutter axially adjustable in said slide; manual means for adjusting said cutter axially to position the plane thereof coincident with a tangential line of cut to be made in the body blank when the axis of the latter has been tilted out of its normal position; power means for cyclically effecting relative movement between said slotting cutter and the body blank in performing a succession of slotting operations; and means for indexing said work spindle and blank carried thereby to new positions at the end of each slotting cycle.

2. A machine for cutting angularly disposed slots in an insertable blade cutter body combining a tubular work carriage; a work supporting member rotatably journaled therein; a work blank supporting spindle journaled in said rotatable supporting member; said rotatable member having a laterally extending portion positioned in overlying relation with said spindle for supporting the free end of the body blank in all positions of rotation of the said supporting member; a cutting spindle slide; a slotting cutter axially adjustable in said slide; manual means for adjusting said cutter axially to position the plane thereof coincident with a tangential line of cut to be made in the body blank when the axis of the latter has been tilted out of its normal position; power means for effecting relative movement between said slotting cutter and the body blank in performing the slotting operation; and translating means for said carriage operative in regulating the depth of the tangential and axially inclined slot to be cut in the cutter body.

3. In a cutter blank slotting machine the combination of a work carriage, said carriage having a tubular portion and an extending end portion; circular bearing surfaces in said tubular portion; arcuate bearing surfaces formed on said extending portion, both of said bearing surfaces having a common axis; a rotatable work support journaled in said carriage having bearing surfaces complemental to said first named circular and arcuate bearing surfaces; a work spindle journaled in said rotatable support adapted to mount a work blank; said tubular portion of the carriage member having a lateral opening in the side thereof; a stanchion member secured to said rotatable support and projecting through said lateral opening; an arm member carried by said stanchion in overlying relation with said work spindle; means for tilting said work support, work spindle, stanchion and arm members as a unitary structure angularly about said common axis; and means provided by said arm member for supporting the free end of a work blank mounted to said work spindle.

4. In a cutter blank slotting machine the combination of a work carriage, said carriage having a tubular portion and an extending end portion, circular bearing surfaces in said tubular portion, arcuate bearing surfaces formed on said extending portion, both of said bearing surfaces having a common axis; a rotatable work support journaled in said carriage having bearing surfaces complemental to said first named circular and arcuate bearing surfaces; means for mounting a work blank upon said rotatable support; said tubular portion of the carriage member having an opening in the side thereof; additional means for supporting the work blank including a stanchion member secured to said rotatable support and projecting through said lateral opening; means for tilting said work support, work spindle, and stanchion members as a unitary structure angularly about said common axis; and means provided by said carriage for clamping said arcuate bearing surfaces firmly together; and additional means for clamping said projecting stanchion to said carriage.

5. A slotting machine combining a slotting cutter slide and a tubular work carriage, each of said members being translatable in transverse intersecting planes toward and away from each other; an axially adjustable slotting cutter journaled on said slide; said tubular carriage having an extended portion affording arcuate bearing surfaces; a rotatable work support journaled in said tubular carriage and seating upon said bearing surfaces; said tubular carriage also having a circumferential opening provided in the wall thereof; a stanchion member carried by said rotatable support and projecting through said opening; an arm member mounted on said stanchion in overlying relation with a workpiece mounted upon said work support for supporting the free end of the workpiece; means for tilting said work support, stanchion and arm member as a single unit about the axis of the work support, said tilting movement thereby shifting the workpiece bodily laterally relative to the normal plane of translation of said slotting cutter; and means for adjusting said slotting cutter axially in said slide to position the plane of the cutter at a tangent to the axis of the workpiece whereby said cutter will machine a slot in the workpiece tangent to its axis and simultaneously at an angle to its longitudinal axis; means for rotating the said cutter and for feeding the cutter through the workpiece; and means for translating said carriage electively toward or away from the cutter to regulate the depth of the slot to be cut.

6. A slotting machine combining a cutter slide and a tubular work carriage, each of said members being translatable in transverse intersecting planes toward and away from each other; an axially adjustable slotting cutter journaled on said slide; said tubular carriage having a tubular portion and a lower extended portion affording arcuate bearing surfaces; a rotatable work support journaled in the said tubular portion of the carriage and also seating upon said arcuate bearing surfaces; said tubular portion of the carriage also being provided with a circumferential opening in the wall thereof; a stanchion member carried by said rotatable support projecting through said opening; an arm member mounted on said stanchion in overlying relation with a workpiece mounted upon said work support for supporting the free end of the workpiece; means for tilting said work support, stanchion and arm member as a single unit about the axis of the work support; and means for clamping said unit in tilted position comprising an upper clamp cooperatively related with said stanchion and a lower clamp cooperatively related with said tubular portion; and independent manual means for operating said clamps.

7. A machine for cutting an angularly disposed tapered slot in the periphery of a circular insertable blade cutter body combining a translatable work carriage; a work supporting member rotatably journaled therein; a work blank supporting spindle journaled in said supporting member; additional work supporting means carried by said rotatable member positioned in overlying relation with said spindle for supporting the free end of the work blank in all positions of rotation of the said rotatable supporting member; means for rotating said support thereby to tilt said work blank spindle; a cutter spindle slide; a slotting cutter laterally adjustable in said slide; manual means for adjusting said cutter laterally, said support rotating means and cutter positioning means cooperating to position the plane of the cutter coincident with a tangential line of cut to be made in the work blank when the axis of the latter has been tilted out of its normal position by reason of the tilting of said rotatable support; power means for effecting relative movement between said slotting cutter and the body blank in performing a first slotting operation; means for angularly adjusting the position of the work blank to move the slot formed therein out of the said plane of the cutter; said cutter adjusting means being adapted for readjusting said cutter laterally to position the plane thereof coincident with a tangential line of cut in the readjusted work blank, which line of cut intersects the slot initially formed therein and to taper same upon a second operation of said power means; and means for translating said carriage relative to the said cutter to regulate the depth of the tapered tangential slot to be cut in the work blank.

8. A machine for cutting a tapered slot in the periphery of an insertable blade cutter body disposed at an angle to a radial plane and to the axis of rotation of the cutter body combining a translatable work carriage; a tiltable work supporting member journaled therein; a normally vertical work supporting spindle journaled in said tiltable supporting member; additional work supporting means carried by said tiltable member positioned in overlying relation with said spindle for supporting the free end of the work blank in all positions of tilt of the said supporting member; a cutter spindle slide; a parallel walled slotting cutter laterally adjustable in said slide; manual means for adjusting said cutter laterally to position the plane thereof at an angle to a radial plane of the work blank when the axis of the latter has been tilted out of its normal position; power means for effecting relative movement between said slotting cutter and the body blank in performing slotting operations; means for angularly adjusting the position of the work blank to move the slot formed therein out of the said plane of the cutter; said manual means being operative to readjust said cutter laterally to position the plane thereof as to cut on a different angle to the aforementioned radial plane of the work blank, which line of cut intersects one wall of the slot previously formed and thereby tapers the said slot.

9. A machine for cutting a tapered slot in the periphery of an insertable blade cutter body at an angle to a radial plane thereof thereby to give a tapered blade a rake angle combining a translatable work carriage; a work blank supporting spindle journaled in said carriage; said carriage having a laterally extending portion positioned in overlying relation with said spindle for supporting the free end of the body blank in all positions of adjustment of the said translatable carriage; a cutter spindle slide; a slotting cutter axially adjustable in said slide; manual means for adjusting said cutter laterally relative to a radial plane of the work blank to position the plane of the cutter coincident with a tangential line of cut to be made in the body blank; power means for effecting relative movement between said slotting cutter and the body blank in performing a slotting operation; means for adjusting the cutter body angularly to move the slot formed therein out of said plane of the cutter; said manual means being operative to readjust the cutter laterally to position the plane thereof coincident with a different tangential line of cut intersecting the slot formed in the cutter body; and means for regulating distance between said cutter and the work blank to control the depth of the slot to be cut.

10. A machine for cutting a tapered slot in the periphery of an insertable blade cutter body at an angle to a radial plane thereof to give an insertable tapered blade a rake angle combining a translatable work carriage; a work blank supporting spindle journaled in said carriage; said carriage having a laterally extending portion positioned in overlying relation with said spindle for supporting the free end of the body blank in all positions of adjustment of the said translatable carriage; a cutter spindle slide; a slotting cutter axially adjustable in said slide; manual means for shifting said cutter laterally relative to a radial plane of the work blank to position the line of cut of the cutter at an angle to a radial plane of the work blank; power means for effecting relative movement between said slotting cutter and the work blank in performing a slotting operation; means for effecting a further relative adjustment between the cutter and the work blank to move the slot formed therein out of said plane of the cutter; manual means for readjusting the cutter laterally to position the line of cut thereof at a different angle to said radial plane and to intersect one wall of the slot previously formed in the work blank; and means for regulating distance between said cutter and the work blank to control the depth of the slot to be cut.

11. A machine for cutting a double tapered slot in the periphery of an insertable blade cutter body disposed at an angle to the radius and at an angle to the longitudinal axis of rotation of the cutter body combining a translatable work carriage; a tiltable work supporting member journaled therein; a normally vertical work supporting spindle journaled in said tiltable supporting member; additional work supporting means carried by said tiltable member positioned in overlying relation with said spindle for supporting the free end of the work blank in all positions of tilt of the said supporting member; manual means for tilting said work spindle and support; a cutter spindle slide; a parallel walled slotting cutter laterally adjustable in said slide; manual means for adjusting said cutter laterally to position the plane thereof at an angle to a radial plane of the work blank when the axis of the latter has been tilted out of its normal position; power means for effecting relative movement between said slotting cutter and the body blank in performing slotting operations; means for angularly adjusting the position of the work blank to move the slot formed therein out of the said plane of the cutter; said manual adjusting means for the cutter being operative to readjust said cutter laterally to position the line of cut thereof on a different angle to the aforementioned radial plane of the work blank, which line of cut intersects a wall of the slot previously formed thereby to taper said slot in a radial direction; said tilting means being adapted to readjust the tilt of said work spindle and support to a different angle, and manually operable means for making compensating readjustments to said work blank, slotting cutter, and translatable carriage to position the line of cut of the cutter radially parallel to the opposite wall of the slot and to taper said slot in a longitudinal direction.

12. A machine for cutting a double tapered tangentially disposed slot in the periphery of an insertable blade cutter body combining a translatable work carriage; an angularly adjustable work supporting spindle journaled in said carriage; said carriage having a laterally extending portion positioned in overlying relation with said spindle for supporting the free end of the body blank in all positions of adjustment of the said translatable carriage; a cutter spindle slide; a slotting cutter axially adjustable in said slide; manual means for shifting said cutter laterally relative to a radial plane of the work blank to position the line of cut of the cutter at an angle to a radial plane of the work blank; power means for effecting relative movement between said slotting cutter and the work blank in performing a slotting operation; means for effecting a subsequent relative adjustment between the cutter and the work blank to move the slot formed therein out of said plane of the cutter; said manual means being operative to readjust the cutter laterally to position the line of cut thereof at a different angle to said radial plane and to intersect one wall of the slot previously formed in the work blank thereby to taper said slot in a radial direction; means for tilting said work spindle angularly; and means for making compensating readjustments to said slotting cutter and work blank to position the line of cut of the cutter radially parallel to the opposite wall of the slot and to taper said slot longitudinally.

13. In a work support for a machine tool the combination of a work carriage, said carriage having a tubular portion and an extending end portion; circular bearing surfaces in said tubular portion, arcuate bearing surfaces formed on said extending portion, both of said bearing surfaces having a common axis; a rotatable work support journaled in said carriage having a cylindrical portion and an extending work table portion and having bearing surfaces complemental thereon to said circular and arcuate bearing surfaces; said tubular portion of the carriage member also having a lateral opening in the side thereof; a stanchion member secured to said rotatable support and projecting through said lateral opening for supporting the free end of a workpiece mounted on the work table portion of said rotatable support; means for revolving said work support and stanchion members as a unitary structure angularly about said common axis; and means provided by said stanchion and carriage members for clamping said members in adjusted position.

14. A machine for cutting a tapered slot in the periphery of an insertable blade cutter body at an angle to a radial plane thereof to give an insertable tapered blade a rake angle combining a tiltable work carriage; a work blank supporting spindle journaled in said carriage; a cutter spindle slide; a slotting cutter axially adjustable in said slide; manual means for shifting said cutter laterally relative to a radial plane of the work blank to position the line of cut of the cutter at an angle to a radial plane of the work blank; power means for effecting relative movement between said slotting cutter and the work blank in performing a slotting operation; means for effecting a further relative adjustment between the cutter and the work blank to move the slot formed in the blank angularly out of said plane of the cutter and to incline the axis of the blank laterally; said manual means being adapted for further operation to readjust the cutter laterally to position the line of cut thereof at a different angle to said radial plane and to intersect one wall of the slot previously formed in the work blank upon a second operation of said power means.

15. A machine for forming a tapered slot in the periphery of an inserted blade cutter body, which slot is disposed at an angle to a radial plane and to the axis of rotation of the cutter body and is tapered in a generally radial direction and transversely thereto, combining a work support; a work spindle journaled therein adapted to support a work blank element; a translatable cutter spindle slide; a slotting cutter element laterally adjustable in said slide; a first manual means for rotating said work support thereby to position the axis of said work spindle out of parallelism with the line of travel of said slotting cutter; a second manual means for adjusting said cutter laterally to position the plane thereof at an angle to a radial plane of the work blank; and a third manual means for rotating the work blank angularly about its axis in any tilted position of the work support, said first and second manual means being operative to position the said elements to form a slot in the work blank tangentially disposed and at an angle to the axis thereof, said second and third manual means being operative to reposition the said elements as to form a taper on said slot extending in a generally radial direction, and said first, second and third manual means being operative to reposition the said elements as to form a taper on said slot in an axial direction; and power means for rotating said cutter and for effecting relative movement between the cutter and the body blank in performing a succession of tooling operations.

WILLIAM F. ZIMMERMANN.